W. C. MARSHALL.

Apparatus for Preserving Meat.

No. 6,452. Reissued May 25, 1875.

Witnesses:

Nau Sautwood

E. H. Horsford

Inventor:

W. C. Marshall

THE GRAPHIC CO. PHOTO-LITH. 39 & 41 PARK PLACE, N.Y.

UNITED STATES PATENT OFFICE.

WILLIAM C. MARSHALL, OF NEW YORK, N. Y., ASSIGNOR TO ARTHUR A. LIBBY, OF CHICAGO, ILLINOIS.

IMPROVEMENT IN APPARATUS FOR PRESERVING MEAT.

Specification forming part of Letters Patent No. 43,516, dated July 12, 1864; reissue No. 6,452, dated May 25, 1875; application filed May 19, 1875.

DIVISION B.

*To all whom it may concern:*

Be it known that I, WILLIAM C. MARSHALL, of the city, county, and State of New York, have invented a new and Improved Apparatus for Pressing Meat for Preservation; and I do hereby declare that the following is a full, clear, and exact description thereof, which will enable others skilled in the art to construct and use the same, reference being had to the accompanying drawings forming a part of this specification, in which—

Figure 1:
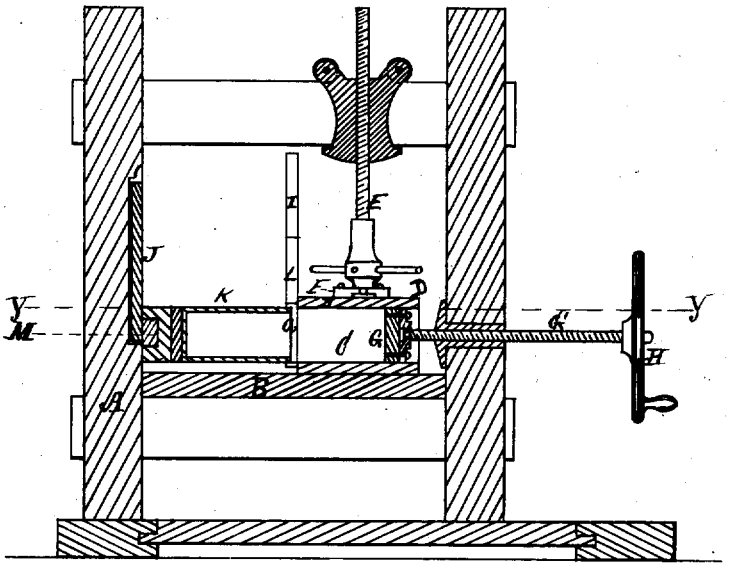
Figure 2:
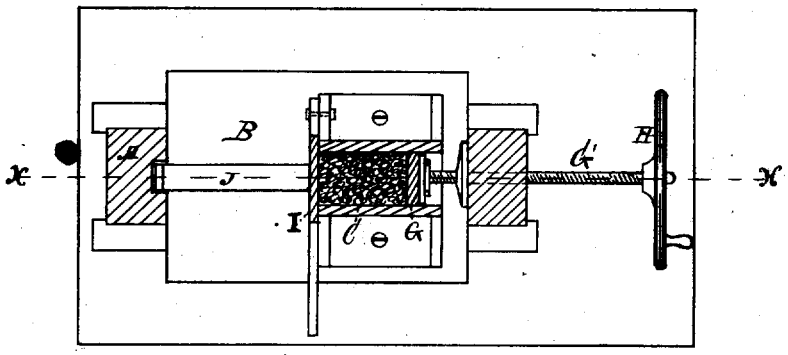

Figure 1 represents a longitudinal vertical section of the apparatus which I use in carrying out my invention, the plane of section being indicated by the line *x x*, Fig. 2. Fig 2 is a horizontal section of the same, taken in the plane indicated by the line *y y*, Fig. 1.

Similar letters of reference indicate like parts.

This part of my invention consists in a press-box, provided with a hinged end and movable screw-top, in combination with a follower, and also with a frame fitting to the end of said press-box, and capable to receive and hold the mouth of a package to be filled with meat, in such a manner that by removing the top of the press-box the meat can be easily introduced, and by closing down said top it (the meat) can be readily compressed to agree with the size of the package, and after it has been compressed, by opening the movable end of the press-box and putting the package in its place, the compressed meat can be easily forced into the package without exposing the package to any undue strain or pressure.

The apparatus referred to consists of a strong frame, A, made of wood or any other suitable material, and provided with a table, B, which supports the press-box C. The top D is suspended from a screw, E, which is tapped into a nut, F, resting on wheels, or otherwise arranged in such a manner that the top can be easily removed from over the box, and, after the meat has been introduced, readily replaced and brought down firmly by means of the screw. G is the follower, which is attached to the screw G′, provided with a hand-wheel, H, or otherwise arranged so that said follower can be readily moved in and out, and a powerful pressure can be exerted by the same.

The end I of the press-box, which is opposite the follower, is hinged, so that it can be easily opened, and when it is closed downward, the box rigged up for compressing a quantity of meat, said hinged end is held in position by a brace, J, which is hinged to one of the uprights of the frame A.

After the meat has been compressed to the desired degree, the hinged end I is thrown open, and the package K, intended to receive the meat, is put in position. The mouth of this package is held in a metallic frame, L, the interior of which is provided with a shoulder, *a*, to the thickness of the sides of the package. A suitable wedge, M, or other device retains the package and frame in position, and by moving the follower in the proper direction the compressed meat is pushed into the package. The meat, being non-elastic, readily retains its bulk, and the sides of the package are not exposed to any undue strain.

Having thus described my invention, I claim as new and desire to secure by Letters Patent—

1. The press-box C, with the movable screw-top D, follower G, and hinged end I, in combination, constructed and operating substantially as and for the purpose herein shown.

2. The frame I, in combination with the package K and press-box C, in the manner and for the purpose substantially as herein set forth.

W. C. MARSHALL.

In presence of—
J. VAN SANTVOORD,
E. N. HORSFORD.